(12) United States Patent
Scholz et al.

(10) Patent No.: US 6,598,482 B2
(45) Date of Patent: Jul. 29, 2003

(54) OVERLOAD RESISTANT DIFFERENTIAL PRESSURE SENSOR

(75) Inventors: Wolfgang Scholz, Minden (DE); Albrecht Vogel, Stutensee (DE); Peter Krippner, Karlsruhe (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 10/172,131

(22) Filed: Jun. 14, 2002

(65) Prior Publication Data
US 2002/0194918 A1 Dec. 26, 2002

(30) Foreign Application Priority Data
Jun. 20, 2001 (DE) .......................... 101 30 376

(51) Int. Cl.[7] .............................................. G01L 15/00
(52) U.S. Cl. ............................ 73/716; 73/715; 73/719; 73/721
(58) Field of Search ................. 73/700, 715–722, 73/706, 756

(56) References Cited

U.S. PATENT DOCUMENTS

| | | | | |
|---|---|---|---|---|
| 4,173,149 A | * | 11/1979 | Critten et al. ................. | 73/706 |
| 5,551,299 A | * | 9/1996 | Tamai et al. ................... | 73/706 |
| 5,763,784 A | * | 6/1998 | Biskup ........................ | 73/716 |
| 5,796,007 A | * | 8/1998 | Panagotopulos et al. ...... | 73/716 |
| 2002/0108447 A1 | * | 8/2002 | Burczyk et al. .............. | 73/716 |

* cited by examiner

Primary Examiner—Edward Lefkowitz
Assistant Examiner—Alandra Ellington
(74) Attorney, Agent, or Firm—Michael M. Rickin

(57) ABSTRACT

A differential pressure sensor has a first and a second measuring chamber. Each measuring chamber is limited by a rigid carrier plate and a diaphragm plate, which is formed in the region of the measuring chamber as a pressure-sensitive measuring diaphragm. To design the differential pressure sensor to be resistant to overloading, the carrier plate is arranged between a first and a second diaphragm plate and has congruent concave depressions on opposite sides in the plane of the plate. The depressions are connected to one another by a decentered duct, penetrating the carrier plate perpendicularly to the plane of the plates. In the region of the measuring chambers, the diaphragm plates are formed congruently in relation to the depressions as pressure-sensitive measuring diaphragms. The measuring chambers and the duct are filled with an incompressible fluid.

19 Claims, 1 Drawing Sheet

OVERLOAD RESISTANT DIFFERENTIAL PRESSURE SENSOR

FIELD OF THE INVENTION

This invention relates to a differential pressure sensor made using glass-silicon technology and more particularly to such a sensor that is useful for process measurements.

DESCRIPTION OF THE PRIOR ART

DE 42 07 949 discloses a capacitive differential pressure sensor made using glass-silicon technology in which a plate of silicon, serving as a pressure-sensitive diaphragm and as a first electrode, is arranged between two carrier plates consisting of glass, the silicon plate and the carrier plate being integrally connected to one another in their edge region by anodic bonding in such a way that in each case a carrier plate combines with the silicon plate serving as the diaphragm to form a measuring chamber, each carrier plate has a pressure supply duct, which runs perpendicular to the contact surfaces of the silicon plate and of the carrier plates and via which the respective measuring chamber can be pressurized, and the surfaces of the carrier plates lying opposite the deflectable region of the silicon plate serving as the diaphragm are each provided with a metallization, serving as a second electrode, in such a way that the first electrode and the second electrodes form a differential-pressure-dependent capacitor arrangement.

The differential-pressure-dependent deformation of the plate serving as a diaphragm brings about a change in capacitance of the capacitor arrangement, the change in capacitance being a direct measure of the differential pressure. The change in capacitance is measured electrically. The capacitor arrangement is connected to a measured-value processing device via connecting conductors.

In addition, German Utility Model DE 200 19 067 discloses a pressure-measuring device with a piezoresistive pressure sensor and hydraulic force transmission in which the process pressure of the measuring medium is transmitted to the pressure sensor by interposing a separating diaphragm with a fluid diaphragm seal, the process-pressure-dependent, diaphragm-seal-displacing deflection of the separating diaphragm being mechanically limited to an amount prescribably exceeding the measuring range, and the pressure sensor being arranged in the pressure-measuring device in such a way that it can move on a mechanically pretensioned overload diaphragm which, in dependence on process pressure exceeding the measuring range, limits a volumetrically variable equalizing space for accepting excess diaphragm seal.

In both cases, the measuring principle is based on the deformation of a diaphragm by the differential pressure present on both sides of the diaphragm. The rigidity of the measuring diaphragms is chosen on the one hand such that as great a deflection as possible is produced in the differential pressure range to be detected, and consequently the greatest possible excursion of the output signal is produced. On the other hand, the rigidity of the diaphragm must be so great that, in the case of overloading at differential pressures above the measuring range, destruction of or damage to the diaphragm is avoided.

A typical value for the required overload resistance of silicon-diaphragm differential pressure sensors is four times the differential pressure of the measuring range end value. This is adequate for many applications, in particular for atmospheric pressure measurement. By contrast, in process measuring technology there are many known applications in which, for example, a measuring range end value of 1 kPa is required in combination with an overload resistance of 40 Mpa. Such overload resistances are achieved in conformity with DE 200 19 067 by what is known as a Florentine flask and an arrangement of additional diaphragms, which limit the maximum differential pressure at the sensor cell to a permissible value.

The interconnected separating diaphragms with a fluid pressure seal disadvantageously represent a considerable cost factor in the fabrication of the pressure-measuring device, amounting to many times the cost of the differential pressure sensor.

In addition, the properties of the separating diaphragms adversely influence the sensor properties, in particular in the case of differential pressure sensors for low differential pressures. The rigidity of the separating diaphragms reduces the measurement dynamics and the responsiveness at the beginning of the measuring range.

The construction with external separating diaphragms hinders miniaturization of the pressure-measuring device and consequently use in applications where space is critical.

The invention is therefore based on the object of specifying an overload-resistant differential pressure sensor which manages without external separating diaphragms for its protection. The present invention achieves that object.

SUMMARY OF THE INVENTION

The present invention proceeds from a differential pressure sensor with a first and a second measuring chamber, each measuring chamber being limited by a rigid carrier plate and a diaphragm plate, which is formed in the region of the measuring chamber as a pressure-sensitive measuring diaphragm.

According to the invention, a single carrier plate is arranged between a first and a second diaphragm plate. The carrier plate has congruent concave depressions on opposite sides in the plane of the plate. The depressions are connected to one another by a decentered duct, penetrating the carrier plate perpendicularly to the plane of the plates. In the region of the measuring chambers, the diaphragm plates are formed congruently in relation to the depressions as pressure-sensitive measuring diaphragms, each measuring chamber being formed by the space between the surface in each case of a concave depression and the surface facing the carrier plate of the associated measuring diaphragm. The measuring chambers and the duct are filled with an incompressible fluid. The measuring diaphragms are hydraulically coupled to one another by means of the fluid.

The concave depressions and the rigidity of the measuring diaphragms are dimensioned in this case in such a way that the measuring diaphragms are freely movable in the measuring range of the differential pressure sensor.

The sides of the measuring diaphragms facing away from the carrier plate are subjected to the process pressures. In this case, the first measuring diaphragm is loaded with the first process pressure and the second measuring diaphragm is loaded with the second process pressure.

If the two measuring diaphragms are subjected to pressure asymmetrically, the measuring diaphragm which is subjected to the stronger pressure curves convexly in the direction of the carrier plate, into the space of the adjoining measuring chamber. The hydraulic coupling causes the other measuring diaphragm to curve convexly away from the carrier plate by the same amount.

If the two measuring diaphragms are asymmetrically subjected to pressure exceeding the measuring range, the measuring diaphragm which is subjected to the stronger pressure comes to bear against the surface of the concave depression. The deflection of the measuring diaphragm which is subjected to the smaller pressure is limited to the same amount by the hydraulic coupling. As a result, damage to the measuring diaphragms during overloading is advantageously avoided. In this case, the differential pressure sensor manages without a separate overload protection system that has separating diaphragms and a Florentine flask.

In addition, it is advantageously possible to dispense with the internal oil filling. This makes the production of the differential pressure sensor according to the invention simpler, and consequently less expensive.

The measuring diaphragms are in direct contact with the process medium, their mobility in the direction of the process medium not being restricted in the measuring range. This prevents instances of damage caused by jamming of particles entrained in the process medium.

The slightly curved surface topography of the concave depressions limits the diaphragm loading in the case of overloading.

Mechanical coupling of two measuring diaphragms with support on one side in each case achieves the effect of overload resistance on both sides of the differential pressure sensor.

The freely accessible, external measuring diaphragms make it easier to apply anticorrosion coatings to prolong the lifetime of the differential pressure sensor in aggressive media.

DESCRIPTION OF THE PREFERRED EMBODIMENT(S)

Figure 1:
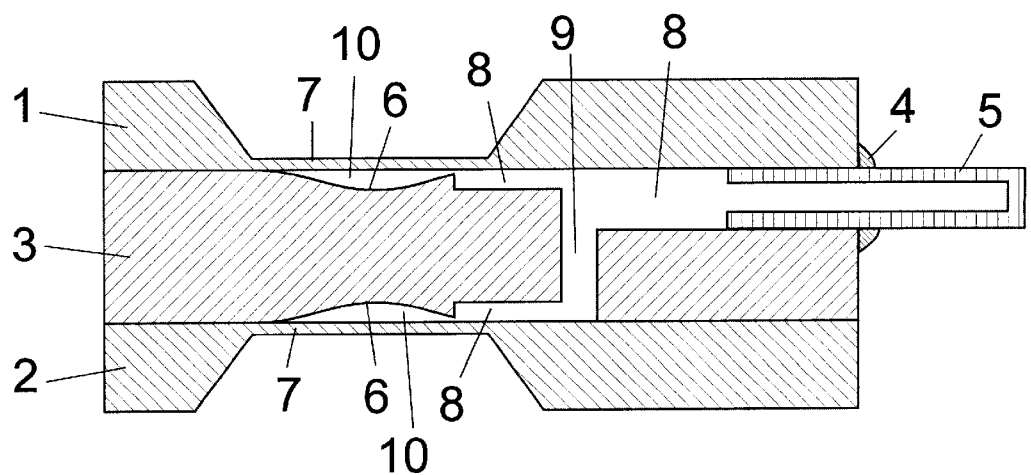
FIG. 1 shows a sectional representation through a differential pressure sensor embodied in accordance with the present invention.
Figure 2:
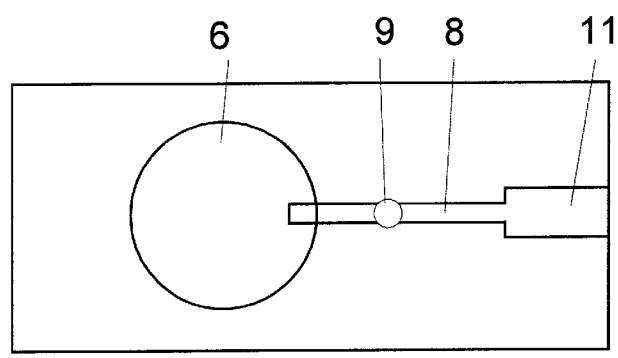
FIG. 2 shows a representation of a plan view of the carrier plate of the sensor of FIG. 1.

In FIG. 1, the construction of a differential pressure sensor in accordance with the present invention is represented in cross section. Using the same reference numerals for the same means, a plan view is shown in FIG. 2.

The differential pressure sensor comprises a first diaphragm plate 1 and a second diaphragm plate 2, which are connected to a carrier plate 3, in each case in surface-area contact at a gastight joint. Both diaphragm plates 1 and 2 have regions of reduced material thickness, which respectively form a measuring diaphragm 7.

On each side facing the diaphragm plates 1 and 2, the carrier plate 3 respectively has a concave depression 6. The two depressions 6 and also the measuring diaphragms 7 of the diaphragm plates 1 and 2 are congruent to one another.

The space between the surface in each case of a concave depression 6 and of a measuring diaphragm 7 of the diaphragm plates 1 and 2 respectively forms a measuring chamber 10. This arrangement allows the measuring diaphragm 7 which is subjected to the stronger pressure when excessive pressure is present to deflect to such an extent that it bears with surface-area contact against the carrier plate 3. In the case of overloading, further deflection is prevented by the carrier plate 3.

The carrier plate 3 additionally has a duct 9, which connects the two concave depressions 6 and is arranged away from the depressions 6. The measuring chambers 10 and the duct 9 are filled with an incompressible fluid. The two measuring diaphragms 7 are hydraulically coupled to one another by this fluid. This coupling has the effect that, in the case of overloading of the measuring diaphragm 7 which is respectively subjected to the stronger pressure, the measuring diaphragm 7 which is respectively subjected to the weaker pressure is also deflected only within the permissible limits.

Furthermore, the carrier plate 3 is provided with a channel-like recess 8, which is widened in the edge region to form a receptacle 11 for a capillary 5. The capillary 5 is connected via the recess 8 to the duct 9 and the measuring chambers 10 to form a self-contained vessel system.

In the production of the differential pressure sensor, the vessel system is filled with an incompressible fluid via the capillary 5. Subsequently, the capillary 5 is closed.

The carrier plate 3 preferably consists of glass, which is connected to the diaphragm plates 1 and 2 at the joints 4 by anodic bonding. The diaphragm plates 1 and 2 consist of silicon. The measuring diaphragms 7 are structured by etching processes.

The capillary 5 preferably consists of quartz glass encased with polyimide and is connected in a gastight manner to the differential pressure sensor at a joint 4. In this case it may be envisaged to connect the capillary 5 to the differential pressure sensor by adhesive bonding. Alternatively, the joint 4 may be a soldered joint. The vessel system is preferably filled with silicone oil.

In a first refinement of the invention, it may be envisaged to read out the differential pressure sensor capacitively to obtain an electrical measuring signal. For this purpose, mutually isolated conductive regions are provided as capacitor coatings on the surface of the depressions 6 and each side of the measuring diaphragm 7 facing a depression 6. These conductive regions preferably consist of gold. For the capacitor coatings on the measuring diaphragms 7 consisting of silicon, a local doping of the silicon may alternatively be provided. These conductive regions are connected to an evaluation circuit (not shown). The electrical connections between the conductive regions and the evaluation circuit are arranged on the glass surface of carrier plate 3. Alternatively, the electrical connections may be arranged on the silicon surface.

In an alternative refinement of the invention, it may be envisaged to read out the differential pressure sensor piezoresistively. For this purpose, mutually isolated piezoresistive conductor tracks 11, which are preferably formed by doped silicon, are arranged on the measuring diaphragms 7. A high sensitivity of the differential pressure sensor is achieved by four piezo resistors in a bridge circuit.

In a further refinement of the invention, it is envisaged to cover the surfaces of the diaphragm plates 1 and 2 facing away from the carrier plate 3 with a protective layer for protection against damage caused by aggressive process media. In a first embodiment, the protective layer consists of diamond. In an alternative embodiment, a protective layer of silicon nitride is provided, which can be produced in a particularly advantageous way by processes known per se for the surface nitriding of silicon. In a third embodiment, a coating with a corrosion-resistant metal is provided.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A differential pressure sensor comprising:
   a rigid carrier plate arranged between first and second diaphragm plates, said carrier plate having congruent concave depressions on opposite sides of said carrier plate;
   a decentered duct penetrating said carrier plate perpendicularly to the plane of said first and second diaphragm plates, said duct hydraulically coupling said depressions to each other;
   first and second measuring chambers, each of said chambers limited by said carrier plate and an associated one of said first and said second diaphragm plates;
   said first and said second diaphragm plates in the region of said associated one of said first and said second measuring chambers are each formed congruently as pressure sensitive measuring diaphragms in relation to an associated one of concave depressions in said carrier plate; and
   an incompressible fluid filling said first and second measuring chambers and said duct.

2. The differential pressure sensor of claim 1 wherein said carrier plate consists of glass.

3. The differential pressure sensor of claim 1 wherein said first and second diaphragm plates consist of silicon.

4. The differential pressure sensor of claim 1 wherein said first and second diaphragm plates are anodically bonded to the carrier plate.

5. The differential pressure sensor of claim 1 wherein the surfaces of said first and second diaphragm plates facing away from said carrier plate are coated with diamond.

6. The differential pressure sensor of claim 1 wherein the surfaces of said first and second diaphragm plates facing away from the carrier plate are coated with silicon nitride.

7. The differential pressure sensor of claim 1 wherein the surfaces of said first and second diaphragm plates facing away from the carrier plate are coated with a corrosion-resistant metal.

8. The differential pressure sensor of claim 1 wherein the surfaces of said first and second measuring diaphragms facing said carrier plate and the surfaces of said concave depressions are conductively coated in such a way that they are isolated from one another.

9. The differential pressure sensor of claim 8 wherein said conductive coating consists of gold.

10. The differential pressure sensor of claim 8 wherein said conductive coating of the surfaces of said first and second measuring diaphragms is formed by a local doping of silicon.

11. The differential pressure sensor of claim 1 wherein mutually isolated piezoresistive conductor tracks are arranged on the surfaces of said first and second measuring diaphragms facing said carrier plate.

12. The differential pressure sensor of claim 11 wherein said piezoresistive conductor tracks are formed by a local doping of silicon.

13. A method for making a differential pressure sensor with first and second measuring chambers comprising:
   a. providing congruent concave depressions on opposite sides of a rigid carrier plate in the plane of said carrier plate;
   b. arranging said carrier plate between first and second diaphragm plates, said first and second diaphragm plates formed congruently in the region of an associated one of said concave depressions as first and second pressure sensitive measuring diaphragms;
   c. hydraulically coupling said concave depressions to each other by a decentered duct which penetrates said carrier plate perpendicularly to the plane of said first and second diaphragm plates; and
   d. filling said measuring chamber and said duct with an incompressible fluid.

14. The method of claim 13 further comprising anodically bonding said first and second diaphragm plates to said carrier plate.

15. The method of claim 13 further comprising coating with diamond the surfaces of said first and second diaphragm plates facing away from said carrier plate.

16. The method of claim 13 further comprising coating with silicon nitride the surfaces of said first and second diaphragm plates facing away from said carrier plate.

17. The method of claim 13 further comprising conductively coating the surfaces of said first and second diaphragm plates facing said carrier plate and the surfaces of said concave depressions in such a way that they are isolated from one another.

18. The method of claim 13 further comprising arranging mutually isolated piezoresistive conductor tracks on the surfaces of said first and second measuring diaphragms facing said carrier plate.

19. The method of claim 18 further comprising forming said piezoresistive conductor tracks by a local doping of silicon.

* * * * *